United States Patent [19]

Reinhard et al.

[11] 4,391,140
[45] Jul. 5, 1983

[54] METHOD AND APPARATUS FOR METERING PARTICULATE MATERIAL

[75] Inventors: Max Reinhard; Horst Kornmayer, both of Bad Homburg, Fed. Rep. of Germany

[73] Assignee: Colortronic Reinhard & Co. KG, Friedrichsdorf, Fed. Rep. of Germany

[21] Appl. No.: 283,081

[22] Filed: Jul. 13, 1981

[30] Foreign Application Priority Data

Jul. 25, 1980 [DE] Fed. Rep. of Germany ....... 3038260

[51] Int. Cl.³ ........................................... G01M 19/00
[52] U.S. Cl. ................................. 73/432 R; 73/863.83
[58] Field of Search ........... 73/863.52, 863.57, 863.83, 73/863.92, 432 V

[56] References Cited

U.S. PATENT DOCUMENTS

| | | | |
|---|---|---|---|
| 1,044,103 | 11/1912 | Swan | 73/432 V |
| 1,151,682 | 8/1915 | Hamilton | 73/863.92 |
| 2,893,602 | 7/1959 | Barber | 73/863.52 |
| 3,280,634 | 10/1966 | Monroe | 73/863.92 |
| 3,433,078 | 3/1969 | Thompson | 73/863.56 |
| 3,735,641 | 5/1973 | Bink | 73/863.52 |
| 4,218,920 | 8/1980 | John | 73/863.54 |

*Primary Examiner*—S. Clement Swisher
*Attorney, Agent, or Firm*—Bernard, Rothwell & Brown

[57] ABSTRACT

The invention relates to apparatus for sampling partial quantities from metering devices for granular or pulverized substances into the mixing vessels of plastics processing machines with a metering station having a vessel with a bottom plate and a rotatable metering disc disposed directly above the bottom plate and having apertures for receiving portions of the substance to be metered. A discharge aperture for the portions is disposed under a covering and is in alignment with an inlet aperture in the mixing vessel. In order to sample a portion in order to be able to weight it, the portion is intercepted after it has been separated from the body of the substance in the metering station and while it is being conveyed to the mixing vessel, without moving the mixing station away from the mixing vessel.

10 Claims, 5 Drawing Figures

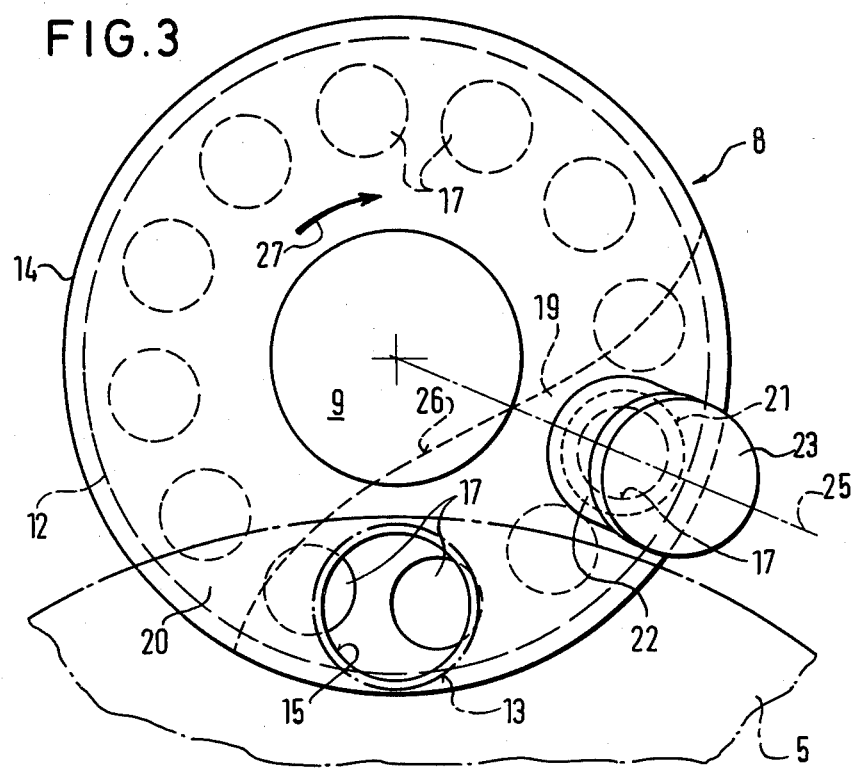
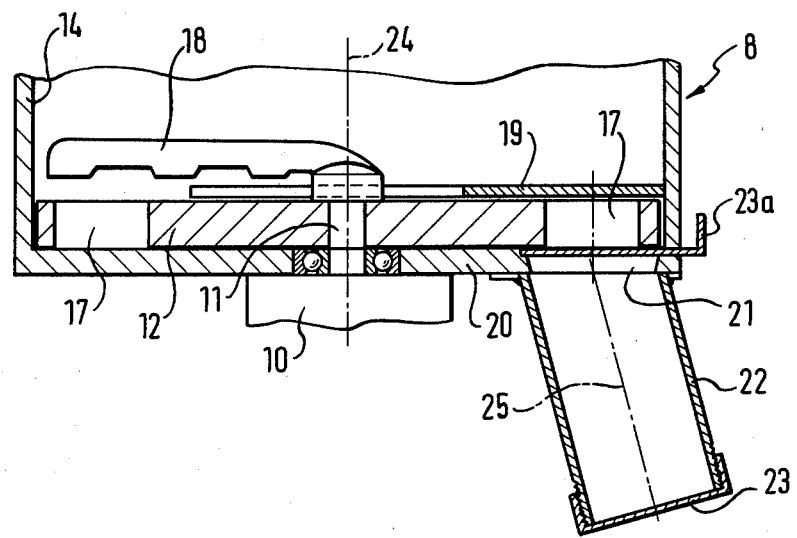

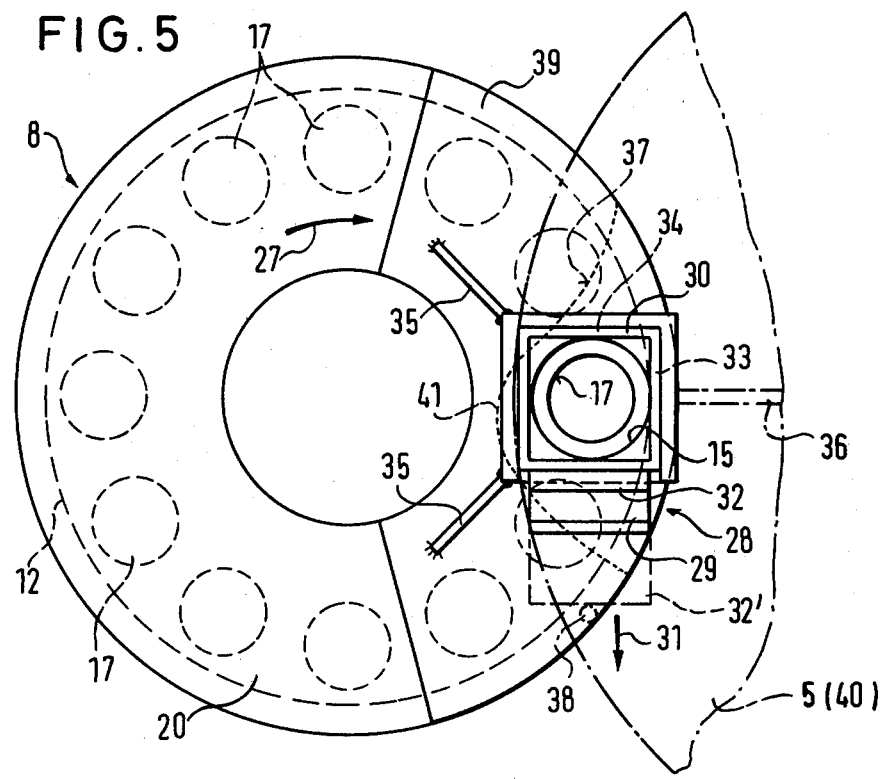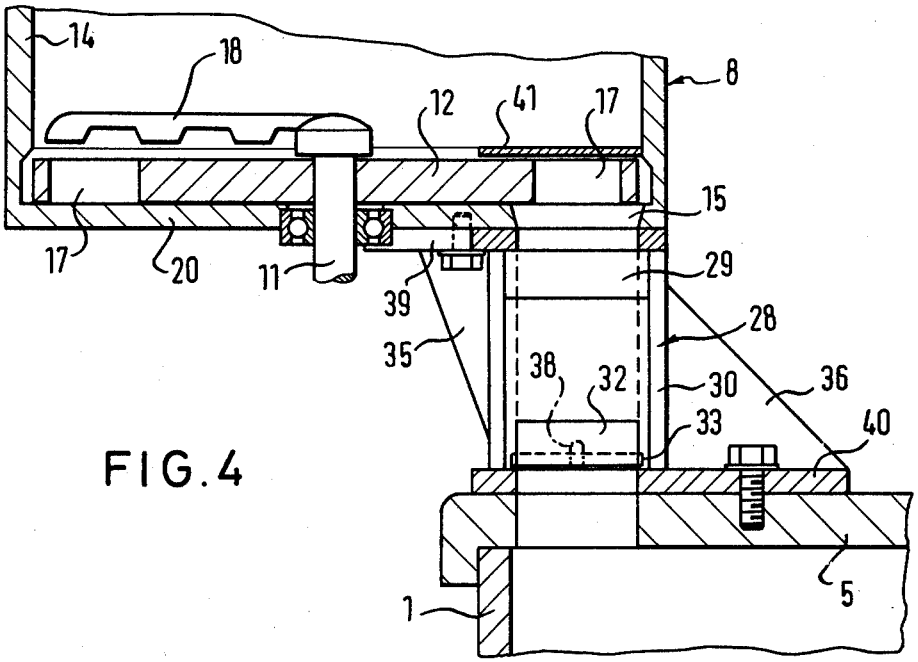

METHOD AND APPARATUS FOR METERING PARTICULATE MATERIAL

FIELD OF THE INVENTION

The invention relates to apparatus for metering particulate material (e.g. granules or powder) into a mixing vessel, e.g. of a plastics processing machine, comprising a metering station with a vessel having a side wall and a bottom plate, a rotatable metering disc disposed directly above the bottom plate and having apertures for receiving the substance which is to be metered, and an aperture for portions of the material in the bottom plate or side wall, which aperture is disposed beneath a cover and is in alignment with an aperture in the mixing vessel.

BACKGROUND OF THE INVENTION

When portions of granular or pulverized substances are obtained from a metering station which is mounted directly on the mixing vessel of a plastics processing machine, it has hitherto been common practice to detach the connection and to meter one or more portions into a measuring vessel in order to accurately define the weight of such portions and thus to define the metering ratio of various substances for a specific injection product of a plastics processing machine.

Such a procedure is time-consuming, since for this purpose the metering station must be detached from the mixing vessel above the plastics processing machine, at least temporarily, and must subsequently be mounted on the machine. The prior art already discloses automatic lifting devices for the purpose of effecting such temporary removal of the metering station from the mixing vessel, and one or more metering stations can be raised from the location of their use on the lid of the mixing vessel by means of such lifting devices, for example pneumatically, by the distance which is necessary in order to remove the samples. Such lifting work to a height of 20 to 30 cm above the lid of the mixing vessel calls for complex additional apparatus and cannot be embodied in every case, since the structural height above the metering stations at the location of use of the injection moulding machine is frequently limited.

In order to obtain precise determination of the partial quantities contained in the individual chamber volumes of the metering disc of disc metering devices, for example according to German Patent Specification No. 19 47 405, or in gear metering devices, for example according to German Patent Specification No. 22 14 982, it has hitherto been the practice to collect a specific number of partial quantities, for example ten, in a separate measuring vessel in order to define the weight of such partial quantities and to adjust the metering device accordingly.

A method of this kind becomes even more time consuming and therefore more expensive if a plurality of metering stations are flange mounted on a mixing vessel, for example one metering station for the principal component of the plastics material, a second station for the regenerate, and a third for the pigment. In this case it is necessary for the procedure and removal and weight determination to be performed three times.

It would therefore be desirable to arrange the initially mentioned apparatus so that the described method for removing partial quantities of substance to be metered can be simplified and can be performed more rapidly without the need for moving, at least temporarily, one or more of the metering devices from the mixing hopper of the plastics processing machine.

SUMMARY OF THE INVENTION

The present invention provides an apparatus for the volumetric metering of granular and pulverized substances into the mixing vessel of a plastics processing machine in which one samples separated partial quantities of substances to be metered for determining the weight thereof prior to delivery into the mixing vessel, characterized in that the separated partial quantities are sampled while being supplied to the mixing vessel when the metering station is closed and prior to feeding into the mixing vessel.

The invention also provides apparatus for metering granular or pulverized substances into the mixing vessel of a plastics processing machine, with a metering station which is provided with a vessel and bottom plate, a rotatable metering disc disposed directly above the bottom plate and having apertures for receiving the substance which is to be metered and with an open aperture in the bottom plate or side wall of the vessel for partial quantities of the substance, which is disposed beneath a cover and is in flush alignment with an open aperture in the mixing vessel, characterized in that for the purpose of sampling partial quantities the bottom plate or side wall of the vessel of the metering station is provided, in the direction of rotation of the metering disc and upstream of the open aperture for the partial quantities of the substance beneath the same cover and beyond the lid of the mixing vessel, with an additional open aperture to which a sampling device can be attached in the form of a pipe which can be closed with at least one lid.

Furthermore, the invention provides apparatus for metering granular or pulverized substances into the mixing vessel of a plastics processing machine with the metering station which is provided with a vessel and bottom plate, a rotatable metering disc disposed directly above the bottom plate and having apertures for receiving the substance which is to be metered and with an open aperture in the bottom plate or side wall of the vessel for partial quantities of the substance, which is disposed beneath a cover and is in flush alignment with an open aperture in the mixing vessel, characterized in that for the purpose of sampling partial quantities a sampling device in the form of a drawer guided in a shaft and having a removable bottom is disposed between the open aperture in the mixing vessel and the aperture of the bottom plate or side wall of the metering station vessel and the removable bottom is formed by a slide which is guided in friction.

In a preferred embodiment, the outside of the shaft is stiffened with ribs, the guide for the slide in the side walls of the drawer extends outwardly beyond the shaft region and a stop abutment for the slide in the open position thereof is disposed on a bottom plate which is mounted on the lid of the mixing vessel.

By virtue of the apparatus constructed in this manner it is possible for the operator of the plastics processing machine to quickly adjust the desired metering ratio for a specific production on the plastics processing machine.

It will be understood, that the sampling arrangement of the metering apparatus according to the invention must be adapted to the metering stations in use. An advantageous sampling device can be constructed for a metering device with a perforated disc, for example in accordance with the German Patent Specification No. 19 47 405 (axial metering apertures in the metering disc and open apertures in the bottom plate of the metering vessel) or in a metering device with a gearwheel according to the German Patent Specification No. 22 14 928 (radial openings in the metering disc and open apertures in the side wall of the metering vessel).

Further details of the invention are disclosed in the following description of two embodiments of apparatus for performing the method according to the invention as illustrated in the accompanying drawings.

BRIEF DESCRIPTION OF THE DRAWINGS

FIG. 2 is a section through the sampling device of FIG. 1, on an enlarged scale;

FIG. 3 is a bottom view of the sampling device according to FIG. 2;

FIG. 4 shows a second embodiment of a sampling device, comprising in this case a drawer with a removable bottom disposed between the metering vessel and the mixing vessel; and FIG. 5 shows a bottom view of the sampling device according to FIG. 4.

DESCRIPTION OF PREFERRED EMBODIMENTS

Figure 1:
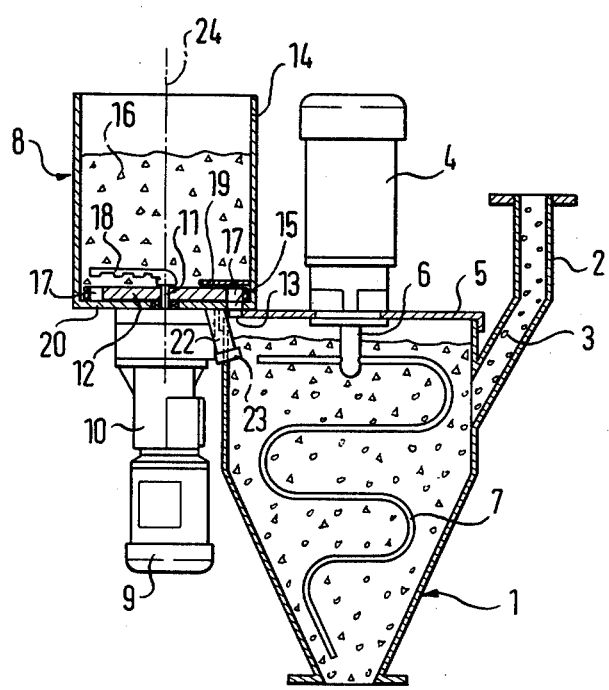
FIG. 1 shows diagrammatically and in vertical section a mixing vessel for mixing a principal plastics component with an additive which is supplied via a laterally flange-mounted metering station which is provided with a sampling device.

As can be seen by reference to FIG. 1, a mixing vessel 1, fed via a lateral inlet pipe 2 with the principal component 3 of the plastics material from a storage vessel (not shown), supports a motor 4 on its lid 5. An agitator 7 is driven by the motor shaft 6.

A metering station 8 is attached to the left-hand edge of the lid 5. The metering station 8 is driven by an electric motor 9 via a gear transmission 10. A perforated metering disc 12 is disposed on the shaft 11 of the geared motor 9,10. Above an aperture 13 in the lid 5 of the mixing vessel there is a corresponding aperture 15 in the bottom 20 of a vessel 14 forming part of the metering station 8. The aperture 15 is in alignment with the aperture 13. The metering disc 12 is disposed on the bottom 20 of the vessel 14, which contains a granular or powdery additive 16. On its circular circumference the disc 12 is provided in a known manner with a plurality of apertures 17 which, in the course of the rotation of the disc 12, are filled with the additive 16, characterised in the vessel 14 by small triangles. If one of the apertures 17 is in alignment with the apertures 13,15, a corresponding metered quantity of the additive 16 flows into the free space below the lid 5 of the mixing vessel 1 and is mixed in the vessel 1 with the principal component 3 of the plastics material, indicated in the drawing by small circles.

An optional agitator arm 18, connected to the rotary shaft 11, ensures that lumping together of the particulate material in the vessel 14 is avoided. A cover 19 ensures that no additive 16 can drop directly through the apertures 17,15,13 into the mixing vessel 1 but only the quantity of additive 16 metered into a closed chamber defined by an aperture 17, the bottom 20 of the vessel 14, and the cover 19 as soon as the said chamber is able to discharge through the apertures 15,13 into the mixing vessel 1.

The above-described apparatus for metering granular or pulverized material into the mixing hopper of a plastics processing machine provides satisfactory results, since very good metering accuracy of the additive 16, relative to the principal plastics component 3, can be achieved by the many small partial steps involved in volumetric metering of the additive 16. A specific difficulty does, however, occur in the adjustment of the station, since the volumetrically separated portions which are entrained by a metering cell, for example the volume of the aperture 17 in the disc 12, must first be defined for a specific bulk density. To this end, the metering station 8 was hitherto removed from the lid 5 of the mixing vessel and a specific number of portions were removed from the apertures 17 of the disc 12, collected in a measuring vessel, and weighed. It is here that the apparatus according to the invention provides a remedy in that one or more of the portions which have already been volumetrically separated from the bulk of the additive 16 are collected prior to being delivered to the mixing vessel by the metering station. Thus the metering station, which is mounted on the mixing vessel, need not be moved and the collected portion or portions can be removed from separate sampling devices for determining the weight.

The bottom 20 of the vessel 14 can simply be provided, and adjacent to the aperture 15, with an additional aperture 21 to which a sample receiver in the form of a sloping pipe 22 is attached, the bottom end of which can be closed with a lid 23 or optionally the top end can be closed with a slide 23a immediately beneath the metering disc 12 or it can also be closed simultaneously by means of both closures.

Further details of the sampling device are disclosed in FIGS. 2 and 3. FIG. 2 shows a longitudinal section through the metering station 8, namely through the axis 24 of the vessel 14 and through the axis 25 of the sloping pipe 22.

The volume of the pipe 22 in this embodiment of the sampling device is conveniently such that, for example, ten charges, i.e. ten times the volume of each chamber 17 in the disc 12, can be accommodated by the pipe 22.

The aperture 21 as well as the aperture 15 must be disposed under the cover 19 whose edge contour 26 is shown in broken line in FIG. 3. The arrow 27 indicates the direction of rotation of the disc 12 in the sense that in accordance with the said direction of rotation one cell or aperture 17 of the disc 12 is first situated above the aperture 21 in the bottom 20 of the vessel 14 and discharges thereat into the pipe 22, if a slide 23a is provided and is opened. After a predefined number of rotations of the perforated disc 10 the sample is obtained and weighed. Subsequently, the receiver comprising the sloping pipe 22 and the lid 23 is filled and metering is performed in the above described manner through the aperture 15 and 13 into the mixing vessel 1. It will be understood that the lid 23 can be omitted if the slide 23a is provided. However, if the lid is omitted, it is necessary for the sampled portions to be collected in a separate vessel.

The embodiment of the sampling device according to the invention as illustrated in FIGS. 4 and 5 is particularly advantageous.

In the apparatus illustrated in FIGS. 4 and 5, the receiver constructed in the form of a sloping pipe 22 with a lid 23 and/or slide 23a is replaced by a drawer 28 which can be removed by means of a handle 29 from a square duct or shaft 30 in the direction of the arrow 31.

The bottom of the drawer 28 can also be removed; it is in the form of a slide 32 guided in slots 33 in the side walls of the drawer 28. The fit of the slide 32 in the lateral guide slots 33 and in a front slot 34 disposed in the perpendicular walls of the drawer 28 is such that the bottom 32 remains under frictional engagement in the drawer 28 when the drawer is removed by means of the handle 29, so that the drawer together with its bottom can be readily removed from the shaft 30 for the purpose of sampling. However, if the drawer 28 is allowed to remain in the shaft 30 the slide 32 can readily be removed from the lateral guide slots 33 and from the slot 34 into its open position 32' by applying the necessary force to the handle 29. In this state, the drawer 28 is open at the bottom and a continuous shaft is obtained through which the additive 16 is metered into the mixing vessel 1 during normal operation of the metering station 8.

It will be understood that the metering station 8 must be offset in the upward direction with respect to the lid of the mixing hopper 18 by the height of the sampling device in order to provide space for the shaft 30 and for the drawer 28 which is guided therein. A sampling device of this kind in the form of an autonomous component can be provided with corresponding cover plates and bottom plates 39,40 which can be mounted on the bottom 20 of the metering station 8 and on the lid 5 of the mixing vessel, respectively, and are connected by means of stiffening ribs in the form of angle supports 35,36 to the walls of the shaft 30. Conveniently, the bottom plate 40 supports a stop abutment 38 to restrict the movement of the slide 32 of the drawer 28 in order that the said slide is captively retained in the lateral grooves 33.

In the embodiment illustrated in FIGS. 4, 5, the slide 32 can be moved into its open position as far as the stop abutment 38 which is mounted on the plate 40. To provide better guidance for the slide, the side walls of the drawer 28 can be broadened downwardly in the direction of the arrow 31 so that the slide 32 can also be captively guided in the drawer 28 in the open position. On the side on which the structural features of the metering station and/or of the mixing vessel provide the best accessibility to the drawer 28, the shaft 30 has no wall or has an aperture for the drawer 28. In FIGS. 4, 5 the drawer 28 is inserted laterally into the shaft 30.

By contrast to the embodiment according to FIGS. 2 and 3, the sampling device according to FIGS. 4 and 5 offers the advantage that no modifications are necessary to the metering station 8 or to the bottom 20 of the vessel 14 of the metering station. The metering station 8 is merely raised with respect to the mixing vessel by the height of the sampling device. While the sampling device according to FIGS. 2, 3 is provided with an additional discharge aperture 21 for the sampling device, adjacent to the discharge aperture 15 in the bottom 20, the vessel 14 of the said exemplified embodiment discharges through the conventional aperture 15 in the bottom 20, either remaining in the sampling device represented by the drawer 28, when the slide 32 is inserted, or passing into the mixing vessel 1, if the slide 32 has been moved into its open position 32'.

We claim:

1. Apparatus for metering particulate material into a mixing vessel, comprising a vessel for containing a body of the particulate material, the vessel having a bottom plate, a metering disc disposed directly above the bottom plate in the containing vessel, the disc being mounted for rotation in a given direction and having apertures for separating respective portions from the body of material, the containing vessel having first and second apertures positioned so that each disc aperture comes successively into alignment with them, the first, upstream aperture being intended for connection to a sampling receiver, the second, downstream aperture being intended for connection to a mixing vessel, and covering means in the containing vessel arranged to cover the disc in the region above the first and second apertures in order to prevent the body of material from escaping through the aligned apertures.

2. Apparatus as claimed in claim 1, further comprising a sampling receiver connected to the first aperture.

3. Apparatus as claimed in claim 2, in which the sampling receiver comprises a pipe having an upper end connected to the first aperture and a removable lid closing a lower end of the pipe.

4. Apparatus as claimed in claim 1, further comprising means for selectively opening and closing the first aperture.

5. Apparatus as claimed in claim 1, further comprising a mixing vessel having an inlet aperture aligned with the second aperture.

6. Apparatus for metering particulate material into a mixing vessel, comprising a vessel for containing a body of the particulate material, the vessel having a bottom plate, a metering disc disposed directly above the bottom plate in the containing vessel, the disc being mounted for rotation in a given direction and having apertures for separating respective portions from the body of material, the containing vessel having an outlet aperture positioned so that each disc aperture comes successively into alignment with it, covering means in the containing vessel arranged to cover the disc in the region of the outlet aperture in order to prevent the body of material from escaping through the aligned apertures, a duct having a first end connected to the outlet aperture and a second end intended for connection to a mixing vessel, and a drawer mounted in the duct so as to intercept portions of the particulate material, such intercepted portions remaining in the drawer, the drawer being laterally removable from the duct together with the intercepted portions to such an extent that the intercepted portions can be collected from the drawer while further portions of the particulate material are allowed to pass to the second end of the duct.

7. Apparatus as claimed in claim 6, in which the drawer has a slidable bottom which is removable from the duct while the drawer remains in the duct, thereby allowing the portions to pass to the second end of the duct.

8. Apparatus as claimed in claim 7, in which the slidable bottom is a friction fit in the drawer.

9. Apparatus as claimed in claim 7, further comprising guide means for guiding the slidable bottom into and out of the drawer, and a stop limiting the outward movement of the sliding bottom.

10. Apparatus as claimed in claim 6, further comprising a mixing vessel having an inlet aperture connected to the second end of the duct.

* * * * *